US011560854B2

(12) United States Patent
De Wergifosse et al.

(10) Patent No.: US 11,560,854 B2
(45) Date of Patent: Jan. 24, 2023

(54) FEEDFORWARD CONTROL OF A FUEL SUPPLY CIRCUIT OF A TURBOMACHINE

(71) Applicant: SAFRAN AIRCRAFT ENGINES, Paris (FR)

(72) Inventors: Huguette De Wergifosse, Moissy-Cramayel (FR); Loïc Michel Pierre Pora, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 85 days.

(21) Appl. No.: 16/978,120

(22) PCT Filed: Feb. 28, 2019

(86) PCT No.: PCT/FR2019/050456
§ 371 (c)(1),
(2) Date: Sep. 3, 2020

(87) PCT Pub. No.: WO2019/170984
PCT Pub. Date: Sep. 12, 2019

(65) Prior Publication Data
US 2021/0010430 A1    Jan. 14, 2021

(30) Foreign Application Priority Data

Mar. 5, 2018   (FR) ...................................... 1851879

(51) Int. Cl.
*F02C 9/30*       (2006.01)
*F02C 7/232*      (2006.01)
(Continued)

(52) U.S. Cl.
CPC ................ *F02C 9/30* (2013.01); *F02C 7/232* (2013.01); *F02C 7/32* (2013.01); *F02C 9/263* (2013.01);
(Continued)

(58) Field of Classification Search
CPC .... F02C 9/30; F02C 7/232; F02C 7/32; F02C 9/263; F05D 2220/323; F05D 2240/60;
(Continued)

(56) References Cited

U.S. PATENT DOCUMENTS 6,810,674 B2 *  11/2004  Clements ............... F04C 14/226
                                                        60/773
6,959,536 B1 *  11/2005  Maher ..................... F02C 9/266
                                                        417/540

(Continued)

FOREIGN PATENT DOCUMENTS

EP    2599982 A1    6/2013
FR    2934321 A1    1/2010

OTHER PUBLICATIONS

International Search Report dated Jun. 25, 2019, issued in corresponding International Application No. PCT/FR2019/050456, filed Feb. 28, 2019, 2 pages.
(Continued)

*Primary Examiner* — Kurt Philip Liethen
(74) *Attorney, Agent, or Firm* — Christensen O'Connor Johnson Kindness PLLC (57) ABSTRACT

A fuel supply system for a turbomachine, comprising a fuel circuit comprising pressurizer at the output of the circuit, a pump arranged to send into the circuit a fuel flow rate which is an increasing function of the rotational speed of a shaft of the pump, and a control circuit arranged to control the device to comply with a flow rate setpoint at the output of the fuel circuit. The system further comprises a feedforward corrector circuit configured to calculate an increment of the flow rate setpoint as a function of the engine speed of the turbomachine and of a variation in the engine speed of the turbomachine, and to add this increment to the flow rate setpoint. A method of regulating the pump is also described.

7 Claims, 4 Drawing Sheets

(51) Int. Cl.
*F02C 7/32* (2006.01)
*F02C 9/26* (2006.01)

(52) U.S. Cl.
CPC .... *F05D 2220/323* (2013.01); *F05D 2240/60* (2013.01); *F05D 2250/90* (2013.01); *F05D 2260/40311* (2013.01); *F05D 2260/606* (2013.01); *F05D 2270/02* (2013.01); *F05D 2270/304* (2013.01); *F05D 2270/44* (2013.01); *F05D 2270/80* (2013.01)

(58) Field of Classification Search
CPC ....... F05D 2250/90; F05D 2260/40311; F05D 2260/606; F05D 2270/02; F05D 2270/304; F05D 2270/44; F05D 2270/80; F05D 2260/406; F01D 17/26
See application file for complete search history.

(56) References Cited

U.S. PATENT DOCUMENTS

| | | | | |
|---|---|---|---|---|
| 9,249,683 | B2* | 2/2016 | Bader | F01D 21/003 |
| 9,964,046 | B2* | 5/2018 | Oba | F04D 15/0066 |
| 11,136,935 | B2* | 10/2021 | Albing | F02D 41/22 |
| 2005/0016176 | A1* | 1/2005 | Griffiths | F02C 9/28 60/734 |
| 2007/0044768 | A1* | 3/2007 | Eick | F02C 7/236 123/478 |
| 2008/0134684 | A1* | 6/2008 | Umeh | F02C 9/46 60/39.281 |
| 2010/0018182 | A1 | 1/2010 | Bader et al. | |
| 2010/0064657 | A1 | 3/2010 | Mahoney et al. | |
| 2017/0248081 | A1* | 8/2017 | Roach | F02C 7/36 |
| 2020/0056507 | A1* | 2/2020 | Walker | F16H 1/28 |

OTHER PUBLICATIONS

Written Opinion of the International Searching Authority dated Jun. 25, 2019, issued in corresponding International Application No. PCT/FR2019/050456, filed Feb. 28, 2019, 7 pages.

Written Opinion of the International Searching Authority dated Jun. 25, 2019, issued in corresponding International Application No. PCT/FR2019/050456, filed Feb. 28, 2019, 6 pages.

International Preliminary Report on Patentability dated Sep. 8, 2020, issued in corresponding International Application No. PCT/FR2019/050456, filed Feb. 28, 2019, 1 page.

* cited by examiner

FEEDFORWARD CONTROL OF A FUEL SUPPLY CIRCUIT OF A TURBOMACHINE

FIELD OF THE INVENTION

The present invention relates to the field of turbomachines. It relates more particularly to the fuel supply circuit and the regulation of the fuel flow rate in this circuit.

BACKGROUND

The prior art comprises in particular patent applications US-A1-2010/064657, FR-A1-2 934 321 and EP-A1 2 599 982.

Figure 1:
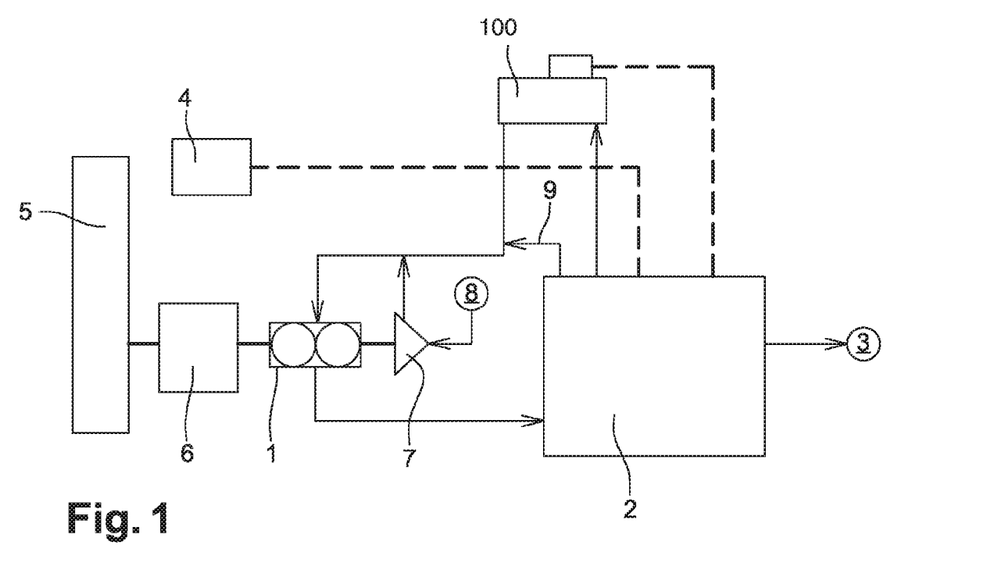
FIG. 1 shows a very schematic representation of a fuel circuit according to the prior art.

Turbomachines installed on an aircraft are equipped with a fuel supply circuit, delivering fuel to the combustion chamber, which must be regulated as required according to flight conditions. Referring to FIG. 1, the fuel circuit generally comprises a positive-displacement type high-pressure main pump 1 that delivers fuel to a hydromechanical unit 2 before injection into the combustion chamber 3. The assembly is arranged to provide a fuel flow rate at the outlet toward the combustion chamber adapted to the need. A control housing 4 generally controls the hydromechanical unit 2 so that it adapts the flow rate sent by the pump 1 to the needs of the combustion chamber 3.

In general, the pump 1 is driven by an output shaft of the accessory gear box 5 of the turbomachine, itself driven by a shaft of the primary body of the turbomachine, not shown in FIG. 1. A drive device 6 is generally installed between the shaft of the accessory gear box 5 and the pump 1 to adapt the rotational speeds between these two pieces of equipment. This device determines a ratio K between the speed of the pump 1 and the rotational speed ω of the engine shaft of the turbomachine. This device usually also drives a means 7 for supplying the circuit from the fuel tanks 8.

The linear characteristic Cyl of the pump 1 between the fuel flow rate and its drive speed depends in particular on its displacement. The pump 1 must be dimensioned in such a way that this displacement enables the required flow rates to be delivered at all operating speeds of the turbomachine, thus the speed of the output shaft of the accessory gear box 5, at both low and high speeds.

Figure 2:
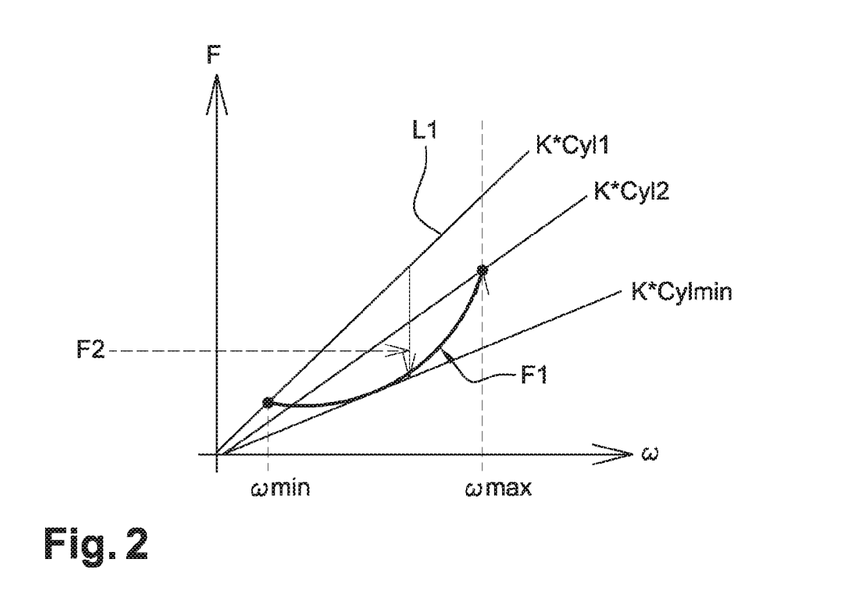
FIG. 2 shows a diagram of AGB rotational speed and flow rate showing the difference between the flow rate supplied by the fuel pump and the requirement for a circuit according to FIG. 1.

As can be seen in FIG. 2, representing the variations in flow rate F as a function of the rotational speed ωAGB (AGB—Accessory Gear Box) of the engine shaft of the turbomachine, the fuel requirement F1 varies in a non-linear manner as a function of the engine speed of the turbomachine. The rotational speed ωAGB of the engine shaft of the turbomachine varies between a minimum value ωAGBmin, for ignition of the turbomachine, and a maximum value ωAGBmax for take-off. The engine speed corresponding to a cruising flight lies between these two extremes.

Depending on the application, the crucial point is located either at low speed ignition or at take-off, at high speed. In FIG. 2, this crucial point is located at the ignition, the pump displacement must be chosen so that its linear characteristic is equal to the value Cyl1, to ensure sufficient flow rate during all flight conditions. This value Cyl1 may be significantly higher than the minimum value Cylmin required under certain flight conditions, or even the value Cyl2 required during take-off.

According to this sizing, the flow rate provided by the pump therefore follows the line L1 on the flow rate/rotational speed diagram in FIG. 2. During a large phase of drive speed, especially in cruising flight, the pump therefore delivers a flow rate greater than the fuel flow rate requirement, thus an excess fuel F2.

The hydromechanical unit 2 must therefore return to the pump, via a recirculation loop 9, the excess fuel F2 over the requirement.

This fuel flow rate control problem is further accentuated when the fuel circuit is used, as shown in FIG. 1, to supply the variable-geometry (VG) actuators 100 operating moving elements 10 (such as variable pitch vanes) of the turbomachine. The actuation of the moving elements 10 creates variations in the fuel requirement in the circuit which must be taken into account in the sizing of the pump 1, the operation of the hydromechanical unit 2 and the characteristics of the recirculation loop 9.

This architecture of the fuel supply system has several drawbacks. The excess flow rate injected by the pump 1 induces an excess of power draw on the accessory gear box 5 compared to the need, which is detrimental to the efficiency of the turbomachine. The excess mechanical power is converted into thermal power which is dissipated in the recirculation loop 9 and must be discharged. This has a negative influence on the size and mass of the fuel circuit, especially for heat exchangers, not shown, placed to remove heat from this circuit.

It is therefore important to adapt the flow rate of the pump 1 to the various operating points of the turbomachine in order to increase the power taken from the accessory gear box 5, which is not possible with the drive device 6 of the prior art.

In addition, a hydromechanical unit 2 according to the prior art, which is not shown in detail in the figure, is usually composed of:

a metering devise controlled by a servo valve whose position is controlled by a position sensor;

a control valve, sending the excess flow rate delivered by the pump into recirculation loop 9, and regulating the pressure difference at the terminals of the metering device;

a stop valve, piloted by a servo valve allowing the fuel system to be pressurized and the injection to be cut off.

For the hydromechanical unit 2 to operate correctly, recirculation is necessary to ensure a pressure difference at the terminals of the metering device, whether the variable geometries 100 are activated or not.

Thus, the sizing of the pump 1 is normally carried out by considering an excess flow rate equal to the sum of the leaks of the system, the minimum flow rate necessary to regulate the pressure difference at the terminals of the metering device and the flow rate related to the movements of the moving elements 10.

Assuming that the problem of adapting the rotational speed of the pump according to the operating points of the turbomachine has been solved, a conventional fuel circuit requires this latter excess flow rate. It therefore does not allow the maximum gain in power to be achieved by adapting the speed of the pump 1 to the strict requirements.

An initial solution has been proposed to enable the speed of the pump to be adapted to provide a flow rate adapted to the need, by taking a fuel flow rate measurement and adapting the rotational speed of the shaft of the pump according to this measurement. This flow rate control loop is governed by the FADEC (Full Automatic Digital Engine Control) computer with a bandwidth of around 10 to 20 Hz. This solution therefore has a long reaction time and is therefore not very responsive to the flow rate calls of the variable geometries controlled by the FADEC. If this solution is adapted to a fuel circuit without variable geometries (in the case of electric VGs for example), the impact of VG flow rate calls on the injected flow rate will depend on the level of flow rate called and the reaction time of this control loop.

Another solution has been to further add a fast local loop based on the measurement of the pressure at the output of the positive-displacement pump. In fact, during these calls for flow rate due to Variable Geometries, a pressure drop will be observed at the output of the positive-displacement pump.

However, this solution has disadvantages:

the compensation of the pressure drop during the calls for flow rates linked to the control of the variable geometries depends on the dynamics of this local pressure loop, if the electrical power installed to accelerate the low inertia of the motors is insufficient, the speed of the pump cannot be increased again and the pump flow rate cannot be readjusted, the conversion of a flow rate setpoint into a pressure setpoint requires the exact knowledge of the compressibility volumes of the hydraulic circuit, a pressure sensor is to be installed at the output of the pump.

The aim of the invention is to propose a solution that makes it possible to take advantage more optimally of a power gain authorised by adapting the speed of the pump to the fuel requirement of the turbomachine for its different operating points, and allowing to compensate in advance for the flow rate calls of the variable geometries.

SUMMARY OF THE INVENTION

To this end, the invention relates to a fuel supply system for a turbomachine, comprising a fuel circuit comprising a pressurising means at the output of said circuit, a pump arranged to send into said circuit a fuel flow rate which is an increasing function of the rotational speed of a shaft of said pump, a flow rate sensor placed between the output of the pump and the pressurising means, the system comprising a device arranged to drive the pump with a controllable rotational speed, and control means arranged to control the device on the basis of a measurement provided by the flow rate sensor, so as to adapt the rotational speed of the shaft of the pump to comply with a flow rate setpoint at the output of the fuel circuit, characterised in that the fuel circuit supplies variable geometries of the turbomachine, said supply beginning with a tapping on a bypass placed between the output of the pump and the flow rate sensor, and in that the system further comprises, in order to compensate for the impacts of the flow rate calls due to the Variable Geometries on the injection line, a feedforward corrector configured to calculate an increment of the flow rate setpoint as a function of the engine speed of the turbomachine and of a variation in said engine speed of the turbomachine, and to add this increment to the flow rate setpoint.

The control of the Variable Geometries (V.G.) is carried out by a control loop at the level of the FADEC. This control loop generates a position setpoint in the form of a current command sent to the servo valve of the variable geometry to be controlled and receives a position feedback from the position sensor located at the level of the variable geometry.

The system according to the invention thus makes it possible, thanks to the feedforward corrector, to compensate anticipatively the flow rate calls of the variable geometries controlled by the FADEC.

In the prior art systems, when the variable geometries are actuated, the flow rate sensor placed after the bypass toward the actuators sees a drop in flow rate, which forces the control means of the drive device to increase the speed of the pump to increase the flow rate in order to supply the injection chamber and maintain the pressure for the actuators, cooperating for this purpose with the pressurization valve. The feedforward corrector reduces the reaction time of this automatic mechanism during the flow rate calls of the variable geometries.

In addition, the anticipation of these flow rates of the variable geometries calls eliminates the need for a large amount of electrical power to react and obtain the required dynamics.

This system makes it possible to get rid of the pressure control loops at the pump output proposed in the prior art and the system is thus simplified as it does not require any additional sensor (in particular pressure, speed or position) in the supply system.

Finally, taking into account the parameters taken into account, the feedforward corrector can be integrated, with the control means, into a FADEC (acronym for Full Authority Digital Engine Control) type computer of the aircraft, without the need to intervene on the control electronics (or ECU for Electronic Control Unit) of a motor of the pump.

Advantageously and according to the invention, the feedforward corrector determines a position of the moving elements via the position of the variable geometries from a predetermined associative law linking the position of the variable geometries to the engine speed, determines a variation in said position of the variable geometries from said associative law and from the variation in the engine speed of the turbomachine and in the position of the variable geometries, and calculates the increment of the flow rate setpoint by multiplying said variation in the position of the variable geometries by a section of said variable geometries (here actuators).

According to this aspect of the invention, the calculation of the increment is established as a function of the engine speed and of a law linking the position of the variable geometries to the engine speed and thus makes it possible to anticipate in a simple manner the flow rate calls of the variable geometries. The associative law can be variable according to the turbine engines but is known for the turbine engine in which the system is implemented, for the whole flight cycle.

Preferably, control loops for the fuel flow rate and position of the V.G. (Variable Geometries) as well as the feedforward corrector are integrated in a FADEC of an aircraft comprising said turbine engine.

According to a preferred embodiment, the flow rate sensor is produced by a metering device comprising a sliding slide and a sensor for detecting the position of said slide, the circuit being arranged so that the position of said slide indicates the flow rate passing through the metering device.

This makes it possible to use certified components or to upgrade an existing installation.

Advantageously, the drive device is intended to drive the pump from an engine shaft of said turbomachine and is arranged to vary the ratio between the rotational speed of the shaft of the pump and that of the engine shaft.

Preferably, the drive device comprises a reduction gear with an epicyclic gear train comprising three elements, a central planetary gear, an external ring gear and a planet carrier, the planet gears of which mesh with the planetary gear and the ring gear, a first of the three elements being intended to be connected to the engine shaft and a second of the three elements being intended to be coupled to a shaft of the pump, characterised in that said three elements are rotatable about an axis of the reduction gear, in that said drive device further comprises at least first electrical means arranged to rotate the third of said elements of the reduction gear, so as to change a rotational speed ratio between the first and second of said elements.

This solution has multiple advantages. Among other things, it makes it possible to use the reduction gear necessary to provide the correct reduction ratio between the engine shaft and the pump to vary the speed of the pump.

Preferably the drive device comprises second electrical means coupled to the first or second of said elements of the reduction gear, the first and second electrical means being arranged to transfer electrical power reversibly from one to the other.

This solution allows a gain on the power taken for the operation of the pump by a power transfer between the first and second electrical means.

The invention also relates to a turbomachine comprising a system according to the invention.

Advantageously, an accessory gear box is placed between the engine shaft and the drive device.

The invention also relates to a method of regulating a fuel pump for such a turbomachine in an aircraft by implementing laws for controlling the rotational speed of the shaft of the pump, which increase or, respectively, decrease this speed when the flow rate indicated by the sensor decreases or increases, so that the flow rate and the pressure at the output of the circuit are adapted to the flight conditions of the aircraft, characterized in that it comprises a step of feedforward correction of the flow rate setpoint as a function of the engine speed of the turbomachine and of a variation in said engine speed of the turbomachine.

BRIEF DESCRIPTION OF THE FIGURES

The present invention will be better understood and other details, characteristics and advantages of the present invention will appear more clearly on reading the description of a non-exhaustive example which follows, with reference to the annexed drawings on which.

The elements having the same functions in the different implementations have the same references in the figures.

DESCRIPTION OF AN EMBODIMENT

Figure 3:
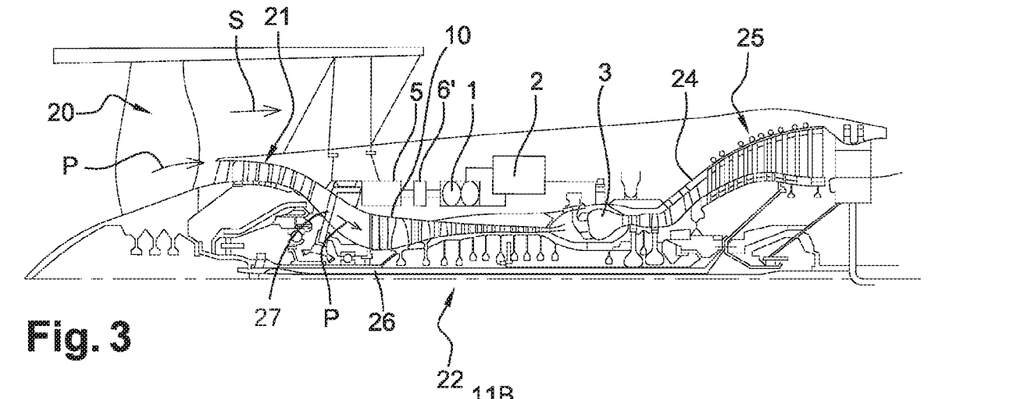
FIG. 3 presents very schematically a half-section of a turbomachine which can use the invention.

In a turbomachine, for example a dual-flow turbomachine as shown in FIG. 3, the airflow at the output of the fan 20 is divided into a primary flow P entering the engine and a secondary flow S surrounding the engine. The primary flow then passes through low-pressure compressors 21 and high-pressure compressors 22, the combustion chamber 3 supplied by the above-mentioned fuel circuit, then high-pressure turbines 24 and low-pressure turbines 25. Generally, the assembly of the high-pressure compressors 22 and the high-pressure turbines 24 rotates as a unit on a common shaft 26 and forms the engine part of the turbomachine with the combustion chamber.

Generally, the engine shaft 26 drives the accessory gear box 5 (via a transfer shaft 27 with an angular bevel gear system) which may comprise several gear trains connected to output shafts to drive various pieces of equipment. Here, one of the output shafts of the gear box drives, via a drive device 6', the positive-displacement pump 1 which supplies the hydromechanical unit 2 injecting the fuel into the combustion chamber 3. Generally also, the accessory gear box makes the link between the engine shaft 26 and a starter/generator, not shown in this figure, which can be used to drive the turbomachine during the starting phases or to generate an electric current when the turbomachine is switched on.

The turbomachine may also comprise moving elements 10, previously mentioned, which can be activated under certain operating conditions by the variable-geometry actuators 100. These moving elements 10 are, for example, variable pitch blades at the inlet of the high-pressure compressor 22.

Figure 6:
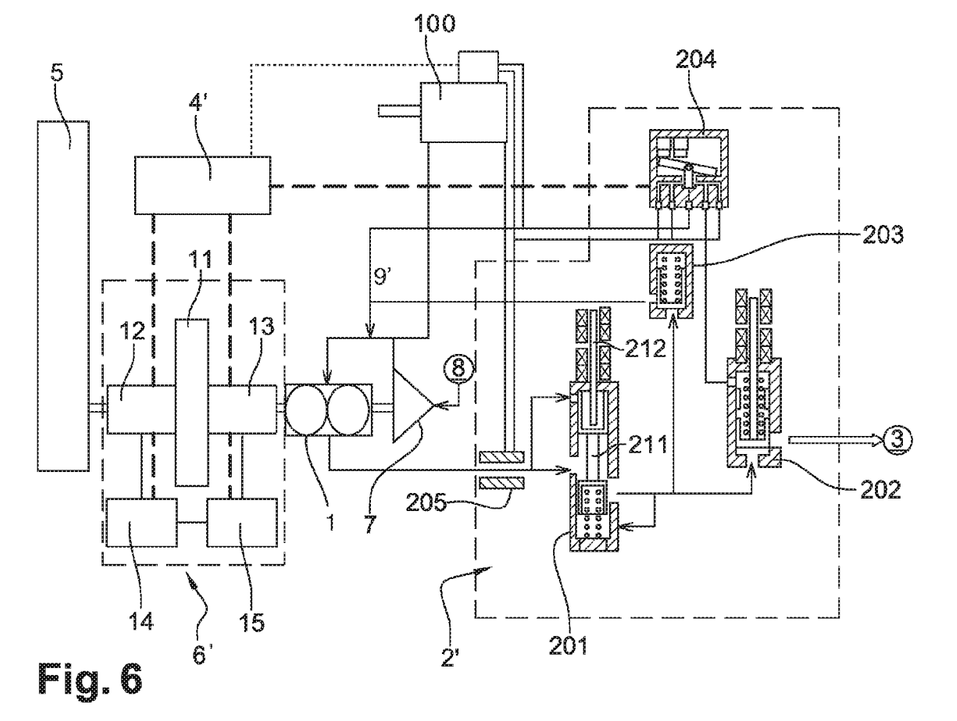
FIG. 6 shows very schematically a configuration of a fuel supply system using the device of FIG. 5.

Here, with reference to FIG. 6, the fuel supply system comprises a drive device 6' between the accessory gear box 5 and the pump 1 different from that of the system in FIG. 1. The pump 1 can be of the same nature as the conventional solution. It is a rotary positive-displacement pump, whose flow rate is an increasing function of the rotational speed $\omega 1$, capable of providing the necessary flow rate for injection into the combustion chamber 3 and pressurising the fuel circuit. Preferably, it has a linear Cyl characteristic linking the output flow rate to the rotational speed $\omega 1$.

First of all, we will show that there is at least one solution for making a device 6' capable of varying the ratio between the rotational speed of the shaft of the accessory gear box 5 and the rotational speed of the shaft of the pump 1, in order to be able to adapt the speed of pump 1 to the different operating points of the turbomachine.

The drive device 6' shown comprises a reduction gear with an epicyclic gear train, the properties of which are used to adapt the rotational speed of the pump 1 to the fuel flow rate requirement at the various operating speeds of the turbomachine.

Figure 4A:
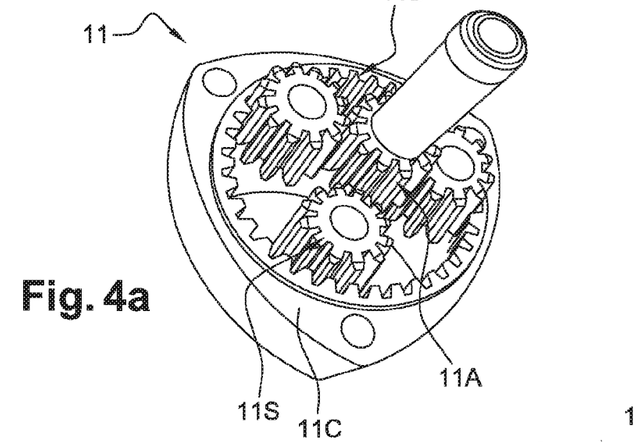
FIG. 4 presents exploded views and a diagram for a reduction gear with an epicyclic gear train which can be used by the invention.
Figure 4B:
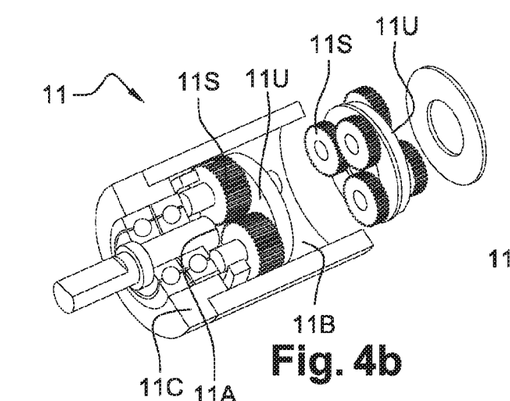
Figure 4C:
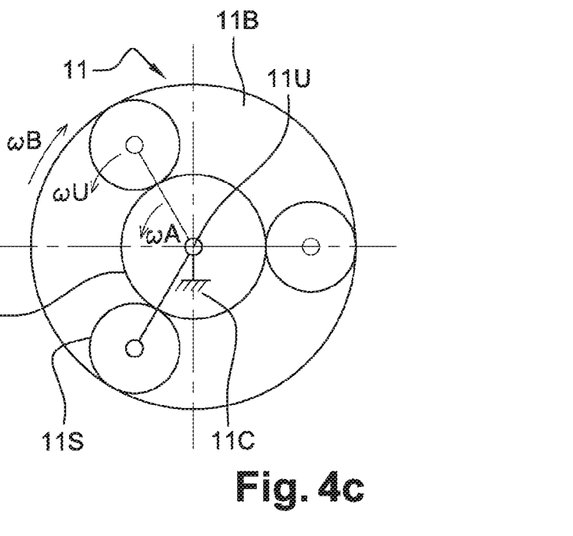

With reference to FIG. 4, the reduction gear 11 with an epicyclic gear train comprises:

a central planetary gear 11A, arranged to rotate around the axis of the gear train at a speed $\omega A$;

planet gears 11S meshing with the central planetary gear 11A and carried by a planet carrier 11U, the planet carrier 11U being arranged to be able to rotate around the axis of the train at a speed $\omega U$;

An external ring gear 11B with which the planet gears 11S also mesh, the ring gear 11B being arranged to be rotatable about the axis of the train at a speed $\omega B$.

A characteristic of the reduction gear 11 with an epicyclic gear train is therefore that its three elements, the central planetary gear 11A, the planet carrier 11U and the ring gear 11B, are able to rotate. Here, for example, the ring gear 11B is free to rotate inside a fixed casing 11C protecting the reduction gear 11.

The operation of the train of the reduction gear 11 is governed by the Willis formula which shows that it is a two-degree-of-freedom mechanism and that knowledge of the rotational speeds of two of the elements of the planetary gear 11A, the planet carrier 11U and the ring gear 11B, allows the calculation of the rotational speed of the third.

Rotation of central planetary gear 11A: $\omega A$
Rotation of the planet carrier 11U: $\omega U$
Rotation of the ring gear 11B: $\omega B$ WILLIS formula: $(\omega A-\omega U)/(\omega B-\omega U)=k$ or
$\omega A-k*\omega B+(k-1)*\omega U=0$ In Willis formula, the factor k, also called the ratio of the train, is a constant determined by the geometry of the gears. For the reduction gear 11 in FIG. 4, k=−ZB/ZA, where ZA is the number of teeth of the central planetary gear A and ZB is the number of teeth of the ring gear B. The factor k is therefore negative with a modulus of less than 1.

It is therefore understood that, if the output shaft of the accessory gear box 5 is coupled to one of the three elements and the shaft of the pump 1 is coupled to a second element, it is possible to vary the rotational speed of the pump 1 for a given speed of the shaft of the accessory gear box 5 by varying the rotational speed of the third element.

A first electric motor 12 is coupled to said third element to control the rotational speed of the latter.

Six combinations are possible for positioning the three pieces of equipment, accessory gear box 5, pump 1 and electric motor 12, in relation to the three elements of the reduction gear 11 with an epicyclic gear train.

A second motor 13 is also coupled to one of the elements of the reduction gear 11 which is not connected to the first motor 12. The position of the second motor 13 multiply by two the number of possible combinations for the device 6'. This gives twelve combinations listed in the table below.

This table also shows the function giving the speed $\omega 1$ of the pump 1 from the speed $\omega 5$ of the shaft of the box 5 and the speed $\omega 12$ of the first motor 12. The rotational speed $\omega 13$ of the second motor 13 is determined by the rotational speed of the piece of equipment with which it is coupled in series on the reduction gear 11, either the shaft of the pump 1 or the output shaft of the box 5. In this table, option 1 corresponds to cases where the second motor 13 is coupled in series with the pump 1 on the same element of reduction gear 11, and option 2 corresponds to cases where the second motor 13 is coupled in series with the output shaft of the box 5 on the same element of the reduction gear 11.

Figure 5:
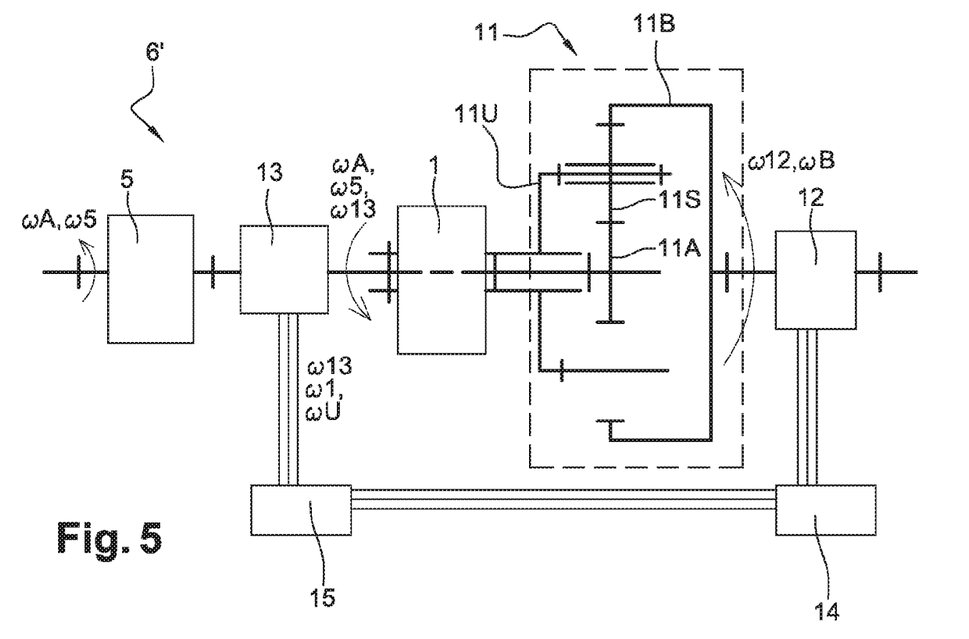
FIG. 5 presents a schematic diagram of an example of a drive device for driving the pump using a reduction gear from FIG. 4.

In the example shown in FIG. 5, corresponding to the "3A-Option1" configuration, the box 5 is connected to the central planetary gear 11A, the pump to the planet carrier 11U, the first electric motor 12 is connected to the ring gear 11B, so that it can rotate the latter, and the second motor 13 is connected to the planet carrier 11U.

The first motor 12 and the second motor 13 each comprise a stator and a rotor. Said motors 12, 13 can be controlled in terms of the torque applied to their rotor and the rotational speed $\omega 12$, $\omega 13$ of their rotor. They are, for example, AC asynchronous motors. The torque and speed of each motor 12, 13 are then controlled by the electrical power and frequency of the current sent by a converter 14, 15 dedicated to each one.

In addition, the second motor 13 is electrically linked to the first motor 12 via said reversible voltage converters 14, 15, in order to transfer power from one to the other.

Figure 7:
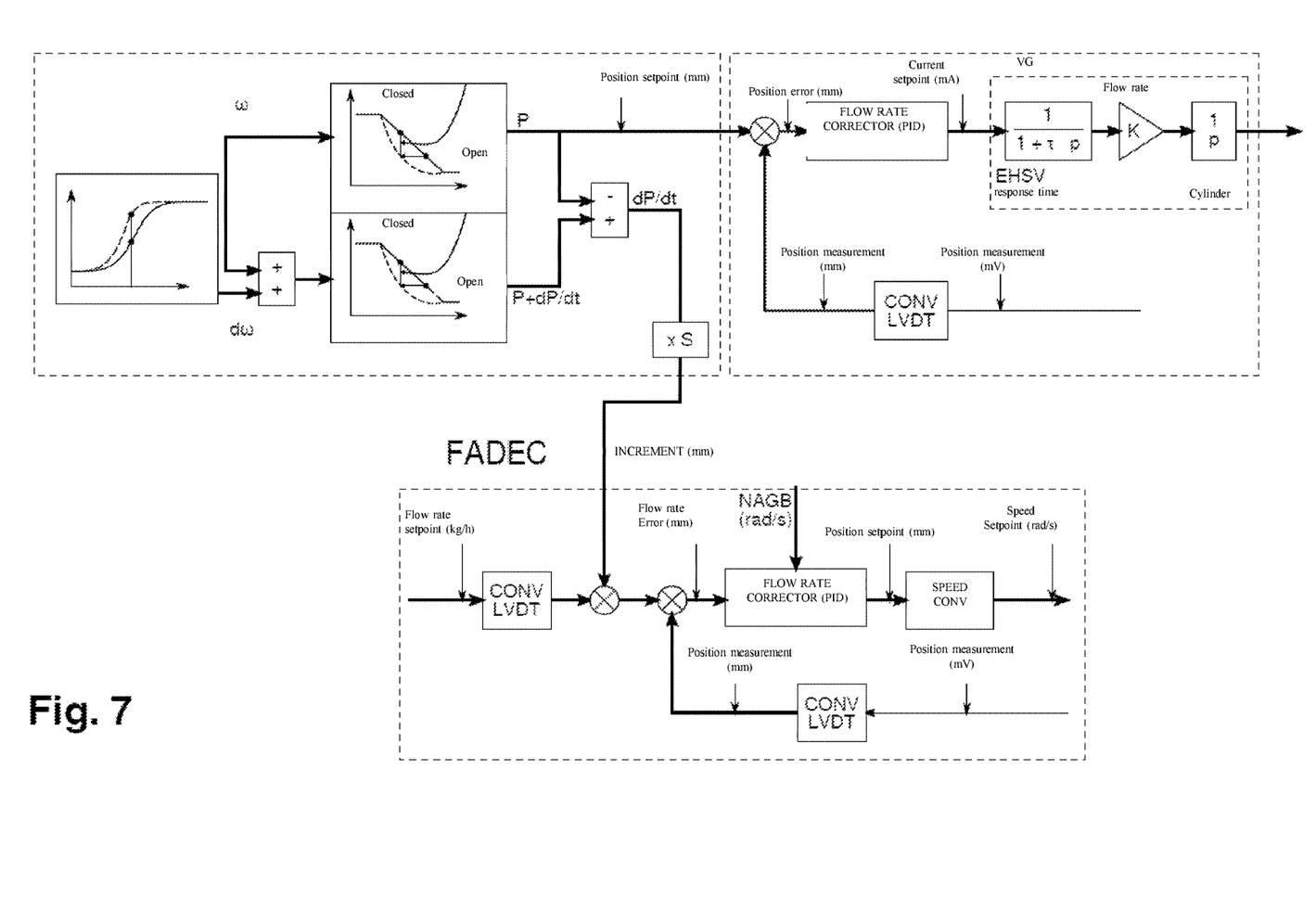
FIG. 7 schematically presents a feedforward corrector of a power supply system according to an embodiment of the invention.

Furthermore, with reference to FIG. 6 or 7, the fuel supply system also differs from that of FIG. 1 in that the control housing 4' is connected to the converter 14, to control the speed $\omega 12$ and the torque of the first motor 12 in order to adapt the speed $\omega 1$ of the pump 1, and to the converter 15, to control the torque of the second motor 13 in order to manage the transfer of power between the two motors.

The study of the reduction gear 11 shows that the CA torque being applied on the planetary gear 11A, the torque CB being applied on the ring gear 11B and the torque CU being applied on the planet carrier 11U are linked by two relationships:

$$CA+CB+CU=0 \text{(balance of the train)}$$

$$\omega A*CA+\omega B*CB+\omega U*CU=0 \text{(power balance)}$$

Taking into account the relationships between the rotational speeds of these elements, this makes it possible to calculate the torques exerted on two elements of the reduction gear 11 knowing the third.

The second motor 13, being connected in series with the pump 1 or the accessory gear box 5, has its rotational speed determined as being equal to that of this piece of equipment.

However, it is understood that it provides an additional degree of freedom to the system depending on the torque it applies, which is added to that of the pump 1 or the box on the corresponding element of the reduction gear 11.

TABLE 1

| | Connection Box/Pump/First motor | | | Connection second motor | |
|---|---|---|---|---|---|
| | Motor 12 | Pump 1 | Pump speed | Option 1 | Option 2 |
| Box 5 connected to the planet carrier 11U | | | | | |
| 1A | ring gear 11B | planetary gear 11A | $\omega 1 = (1 - k)*\omega 5 + k*\omega 12$ | planetary gear A | planet carrier 11U |
| 1B | planetary gear 11A | ring gear 11B | $\omega 1 = -\omega 5*(1 - k)/k + \omega 12/k$ | ring gear B | planet carrier 11U |
| Box 5 connected to the ring gear 11B | | | | | |
| 2A | planet carrier 11U | planetary gear 11A | $\omega 1 = k*\omega 5 + (1 - k)*\omega 12$ | planetary gear A | ring gear B |
| 2B | planetary gear 11A | planet carrier 11U | $\omega 1 = -\omega 5*k/(1 - k) + \omega 12/(1 - k)$ | planet carrier 11U | ring gear B |
| Box 5 connected to the planetary gear 11A | | | | | |
| 3A | ring gear 11B | planet carrier 11U | $\omega 1 = \omega 5/(1 - k) - \omega 12*k/(1 - k)$ | planet carrier 11U | planetary gear A |
| 3B | planet carrier 11U | ring gear 11B | $\omega 1 = \omega 5/k - \omega 12*(1 - k)/k$ | ring gear B | planetary gear A |

This additional degree of freedom can be used to ensure a power transfer with the first motor: either to provide the power when the first motor 12 intervenes to accelerate the pump 1 in relation to the drive of the box 5, or to absorb power when the first motor 12 intervenes to brake the pump 1.

It is possible to use configurations other than the one shown in FIG. 5. The choice depends on the operating characteristics of the turbomachine. The choice of the parameter of the device, which are the factor k of the reduction gear 11 of the epicyclic gear train 11, the ratio of the rotational speed ω5 at the output of the box 5 to the rotational speed of the shaft of the turbomachine, the linear characteristic Cyl of the pump 1, and the choice among the configurations 1A to 3B, must be made in order to achieve the following objectives in particular:

allow the pump 1 to rotate at a speed ω1 that adjusts to provide a flow rate Cyl. ω1 corresponding to the requirement F1, as shown for example in FIG. 2, when the rotational speed of the shaft of the turbomachine varies between its minimum value ωAGBmin and its maximum value ωAGBmax;

minimise the power expended in the motor 12 to adjust the speed ω1 of the pump 1 over the operating range of the turbomachine.

Furthermore, technological constraints on the pieces of equipment used generally imply that:

the speed ω1 of the pump 1 must be lower than that ω5 of the output shaft of the accessory gear box 5.

This concept with two auxiliary electric motors for the drive system between the accessory gear box 5 and the pump 1 is very innovative as it offers the following advantages:

Only the mechanical power corresponding to the power requirement for supplying the variable geometries (pressure requirement) and for supplying the fuel flow rate (fuel flow rate requirement) is taken from the accessory gear box 5, reduction of the displacement of the pump 1, drastic reduction in the sizing of the recirculation loop 9' of the pump flow rate, simplification of the architecture of the hydromechanical unit 2 for controlling the fuel, no external power requirement when controlling the speed of the pump by one motor 12 thanks to the power transfer between this motor and the second motor 13.

In the system described above, the first motor 12 and the second motor 13 are specially dedicated piece of equipment added to operate the drive dive 6'. In one variant, the starter of the turbomachine can be used to act as the first or second motor of the device.

The fuel system concept developed in the following allows optimum use of such a drive device 6'.

With reference to FIG. 6, a fuel supply system according to the invention comprises:

a drive device 6' between the accessory gear box 5 and the pump 1 as described above, allowing the speed of the pump 1 to be adapted;

a pump 1 dimensioned to be adapted to the flow rate provided with the system according to the invention;

a means 7 for supplying the circuit from the fuel tanks 8;

a hydromechanical block 2' according to the invention;

a control electronics 4'.

Here, the fuel supply system is also connected to actuators 100 of moving elements 10.

The hydromechanical unit 2' according to the invention comprises the following elements:

a fuel flow rate sensor 201 between the pump 1 and the injection to the combustion chamber 3;

a pressurization valve 202 at the injection toward the combustion chamber 3;

a return valve 203 placed in bypass between the flow rate sensor 201 and the pressurization valve 202, and connected to a recirculation loop 9';

a servo valve 204 essentially controlling the pressurization valve 202 and the return valve 203.

When the fuel circuit is used to actuate moving elements 10, the fuel circuit advantageously comprises a bypass 205 to supply flow rate to variable-geometry actuators 100 of the moving elements 10. This bypass 205 is placed between the output of the pump 1 and the flow rate sensor 201 of the hydromechanical unit 2'.

In a preferred embodiment, the flow rate sensor 201 is made by a modified metering device. A metering device generally used in a conventional circuit comprises a sliding slide 211 whose position controls the flow rate passing through the metering device. In addition, a sensor 212 for detecting the position of the slide 211 allows the metering device to be servo-controlled, conventionally by a servo valve. In this case, the position of the slide 211 is not controlled by a servo valve but directly by the pressure difference at the terminals of the metering device, in the same way as the control of the control valve of the conventional solution. Knowing the characteristic of this metering unit, the position read by the sensor 212 for detecting the position of the slide 211 provides information on the flow rate actually injected by the fuel circuit into the combustion chamber.

The flow rate information can thus be transmitted to the control electronics housing 4', for example, so that it can act on the drive device 6' and the latter adapts the speed of the pump 1 to ensure the right fuel flow rate as required.

The hydromechanical block 2' therefore loses its flow rate control function but acts as a flow rate sensor. It retains the functions of fuel cut-off and system pressurisation via the pressurisation valve 202.

The pressurisation valve 202 ensures the minimum pressure for the correct operation of the variable geometries 100, as well as the cut-off of the injected flow rate.

The return valve 203 allows the flow rate delivered by the pump 1 to be exhausted in order not to build up pressure in the circuit when this cut-off is activated by the servo valve 204.

However, this recirculation only occurs during the switch-off phase, or when preparing to ignite, the time of the reduction of the rotational speed of the pump 1 being controllable. The recirculation loop 9' is therefore considerably less important than in a conventional circuit.

At ignition, the pump 1 is driven at minimum rotational speed. Part of the flow rate passes through the sensor 201 and is recirculated through the return valve 203.

The speed of the pump 1 is then adapted to reach the correct ignition flow rate setpoint. The servo valve 204 is then activated, which causes the pressure valve 202 to open and the return valve 203 to close, thus allowing the ignition flow rate to be injected into the combustion chamber 3.

Finally, the return valve 203 provides protection in the event of overspeed due to a failure in the control of the speed of the pump 1.

In the event of a flow rate call linked to the actuation of the variable geometries 100, for a given rotational speed of the pump 1, the flow rate through the sensor 201 tends to decrease because of the bypass 205 toward the variable geometries 100, which is placed upstream. The information of a drop in the flow rate forces the drive device 6' to accelerate the speed of the pump 1 in order to maintain the correct injected flow rate requested. Thus, the speed of the pump 1 is controllable.

A control loop based on the flow rate information from sensor 201, installed in the control housing 4', therefore allows the pump speed to be adapted for any operating point of the turbomachine, whether the variable geometries 100 are active or not.

This hydromechanical block 2' concept therefore makes it possible to take advantage of a drive device 6' capable of adapting the rotational speed of the pump as required.

This eliminates the need to size a recirculation loop 9' to dissipate a large excess flow rate and allows for a gain in power taken from the accessory gear box 5 for fuel supply. It also eliminates the need for the control valve that exists in a conventional circuit.

In addition, since the metering device function has been removed, no excess flow rate is required to operate it.

The hydromechanical block 2' therefore makes it possible to take full advantage of the potential power gain offered by the drive device 6'.

FIG. 7 schematically represents a feedforward corrector according to an embodiment of the invention. The feedforward corrector is adapted to a flow rate control loop using the measurement of the flow rate coming from the metering device, in particular the measurement of the position of the slide as described previously.

This position measurement is compared by a comparator with the flow rate setpoint previously converted into mm by a slide position/flow rate conversion table, to give the flow rate error (expressed in mm), processed by a PID type flow rate corrector to give a position setpoint. The position setpoint is converted into the speed setpoint of the first motor 12 via a correspondence table and thanks to the measurement of the rotation speed w of the engine shaft of the turbomachine (as described in reference to FIG. 2).

The feedforward corrector allows the anticipation of the flow rate calls of the variable geometries 100, this anticipation being expressed by a flow rate increment which is added to the flow rate setpoint before the flow rate control loop.

To obtain the value of this increment, the corrector will use the engine speed of the turbomachine, in particular the rotational speed ωAGB of the engine shaft of the turbomachine.

The position P of the variable geometries 100 is directly deductible by a feedforward law of the rotational speed ωAGB of the engine shaft of the turbomachine expressed in the form P=f(ω).

Moreover, thanks to the same feedforward law and knowing also the variation dωAGB/dt of the rotational speed of the engine shaft of the turbomachine (for example from two measurements of this speed), it is possible to determine P+dP/dt with dP/dt the variation of the position P of the variable geometries 100.

By subtracting P from P+dP/dt, dP/dt is obtained which is then converted into flow rate by multiplication with a cross-section of the variable geometries 100 (e.g. the internal cross-section of the actuator chambers) to obtain the flow rate increment added to the flow rate setpoint.

This correction makes it possible to directly anticipate the flow rate calls of the variable geometries according to the engine speed of the turbo engine. This type of anticipatory correction is commonly called feedforward correction. The feedforward correction considers that the relation between the engine speed and the position of the variable geometries 100 (and thus of the moving elements 10) is a known law determined according to the intrinsic characteristics of the turbine engine considered, and can vary according to the turbine engine but is valid throughout the flight cycle for the same turbine engine.

The invention claimed is:

1. A fuel supply system for a turbomachine which, in operation, rotates at a certain engine speed according to flight conditions, the fuel supply system comprising:
    a fuel circuit comprising a pressurizer at an output of said fuel circuit, a pump arranged to send into said fuel circuit a fuel flow rate which is an increasing function of the rotational speed of a shaft of said pump, and a flow rate sensor placed between an output of the pump and the pressurizer;
    a drive device arranged to drive the pump with a controllable rotational speed, the drive device configured to drive the pump from an engine shaft of said turbomachine and arranged to vary the ratio between the rotational speed of the shaft of the pump and that of the engine shaft,
    wherein the drive device comprises a reduction gear with an epicyclic gear train comprising three elements, including a central planetary gear, an external ring gear and a planet carrier through which planet gears mesh with the central planetary gear and the external ring gear, a first of the three elements connected to the engine shaft and a second of the three elements coupled to the shaft of the pump, said three elements being rotatable about an axis of the reduction gear,
    wherein said drive device further comprises at least a first electrical means arranged to rotate the third of the three elements of the reduction gear, so as to change a rotational speed ratio between the first element and the second element of said three elements,
    a control circuit arranged to control the drive device based on a measurement provided by the flow rate sensor, so as to adapt the rotational speed of the shaft of the pump to comply with a fuel flow rate setpoint at the output of the fuel circuit,
    the fuel circuit configured to supply a fuel flow rate to variable-geometry actuators of the turbomachine from a bypass placed between the output of the pump and the flow rate sensor, and
    a feedforward corrector circuit configured to calculate an fuel flow rate increment of the fuel flow rate setpoint as a function of the engine speed of the turbomachine and of a variation in said engine speed of the turbomachine, and configured to add the calculated fuel flow rate increment to the fuel flow rate setpoint,
    wherein the drive device further comprises second electrical means coupled to the first element or the second element of said elements of the reduction gear, the first and second electrical means being arranged to transfer electrical power reversibly from one to the other.

2. The supply system according to claim 1, wherein the feedforward corrector circuit determines a position of moving elements associated with the variable-geometry actuators via the position of the variable-geometry actuators from a predetermined associative law linking the position of the variable-geometry actuators to the engine speed, determines a variation in said position of the variable-geometry actuators from said associative law and from the variation in the engine speed of the turbomachine and the position of the variable-geometry actuators, and calculates the fuel flow rate increment of the flow rate setpoint by multiplying said variation in the position of the variable-geometry actuators by a section of said variable-geometry actuators.

3. The supply system according to claim 1, wherein control loops of the variable-geometry actuators and the feedforward corrector circuit are integrated in a FADEC of an aircraft comprising said turbine engine.

4. The supply system according to claim 1, wherein the flow rate sensor is produced by a metering device comprising a sliding slide and a sensor for detecting the position of said slide, the fuel circuit being arranged so that the position of said slide indicates the flow rate passing through the metering device.

5. A turbomachine comprising a fuel supply system according to claim 1.

6. A method of regulating a fuel pump of a fuel supply system for a turbomachine in an aircraft, the fuel pump having a shaft connected to a drive device that includes a reduction gear with an epicyclic gear train having three elements, including a central planetary gear, an external ring gear and a planet carrier through which planet gears mesh with the central planetary gear and the external ring gear, a first of the three elements connected to a shaft of the turbomachine and a second of the three elements coupled to the shaft of the pump, said three elements being rotatable about an axis of the reduction gear, wherein said drive device further includes a first electrical means arranged to rotate the third of the three elements of the reduction gear, so as to change a rotational speed ratio between the first element and the second element of said three elements, and a second electrical means coupled to the first element or the second element of said elements of the reduction gear, the first and second electrical means being arranged to transfer electrical power reversibly from one to the other, the method comprising:

controlling the rotational speed of the shaft of the fuel pump, which increase or, respectively, decrease this speed when a fuel flow rate indicated by a sensor decreases or increases, so that the fuel flow rate and pressure are adapted to the flight conditions of the aircraft and correcting, in a feedforward manner, the fuel flow rate as a function of engine speed of the turbomachine and of a variation in said engine speed of the turbomachine.

7. The method according to claim 6, wherein said correcting, in a feedforward manner, the fuel flow rate includes:

determining a position of variable-geometry actuators on the basis of a predetermined associative law linking the position of the variable-geometry actuators to the engine speed, determining a variation in said position of the variable-geometry actuators from said associative law and from the variation in the engine speed of the turbomachine and in the position of the variable-geometry actuators, and calculating a fuel flow rate increment to the fuel flow rate by multiplying said variation in the position of the variable-geometry actuators by a section of said variable-geometry actuators.

* * * * *